United States Patent [19]

Holmgren

[11] Patent Number: 5,565,400
[45] Date of Patent: *Oct. 15, 1996

[54] HYDROTHERMALLY STABLE METAL OXIDE SOLID SOLUTIONS AS CARRIERS FOR CATALYTIC COMPOSITES

[75] Inventor: Jennifer S. Holmgren, Bloomingdale, Ill.

[73] Assignee: UOP, Des Plaines, Ill.

[*] Notice: The term of this patent shall not extend beyond the expiration date of Pat. No. 5,393,722.

[21] Appl. No.: 342,461

[22] Filed: Nov. 21, 1994

Related U.S. Application Data

[63] Continuation-in-part of Ser. No. 109,557, Aug. 20, 1993, Pat. No. 5,393,722.

[51] Int. Cl.$^6$ .............................. B01J 21/00; B01J 23/00
[52] U.S. Cl. .............................. 502/328; 502/64; 502/68; 502/306; 502/315; 502/327
[58] Field of Search .............................. 502/64, 68, 306, 502/315, 414, 327, 328

[56] References Cited

U.S. PATENT DOCUMENTS

| | | | |
|---|---|---|---|
| 3,796,792 | 3/1974 | Miyata et al. | 423/250 |
| 3,879,523 | 4/1975 | Miyata et al. | 423/250 |
| 3,879,525 | 4/1975 | Miyata et al. | 423/277 |
| 3,990,866 | 11/1976 | Broecker et al. | 48/214 A |
| 4,562,295 | 12/1985 | Miyata et al. | 568/366 |
| 4,642,193 | 2/1987 | Miyata et al. | 210/682 |
| 5,393,722 | 2/1993 | Holmgren | 502/327 |

FOREIGN PATENT DOCUMENTS

| | | | |
|---|---|---|---|
| 1342020 | 5/1971 | United Kingdom | B01J 11/24 |
| 1380950 | 12/1972 | United Kingdom | C08F 10/004 |
| 1380949 | 12/1972 | United Kingdom | C01F 7/48 |

Primary Examiner—Asok Pal
Attorney, Agent, or Firm—Thomas K. McBride; Eugene I. Snyder

[57] ABSTRACT

Ternary metal oxide solid solutions containing permutations of magnesium, nickel, and cobalt with trivalent metals such as aluminum, chromium, gallium, and iron show unusual resistance to rehydration. A composite comprising a) a ternary metal oxide solid solution of formula, $$A_a(II)B_b(II)C_c(III)O_{(a+b+c)}(OH)_c$$

where:

a, b, and c are atom fractions of A(II), B(II), and C(III), respectively;

C(III) is a trivalent metal cation whose metal is selected from the group consisting of Al, Cr, Ga, Fe, and combinations thereof, and combinations of Al and metals of atomic number 57 through 71;

A(II) and B(II) are divalent metal cations and
  i. A is Mg, B is Ni, and $0.05 \leq a/(a+b) \leq 0.5$; or
  ii. A is Mg, B is Co, and $0.05 \leq a/(a+b) \leq 0.75$; or
  iii. A is Co, B is Ni, and $0.05 \leq a/(a+b) \leq 0.95$;
and $1.5 \leq (a+b)/c \leq 5.0$;

and b) at least one catalytically active species selected from the group consisting of zeolites, synthetic molecular sieves; clays and pillared clays; and molybdenum, vanadium, copper, chromium, manganese, silver, and titanium in an upper valence state, are hydrothermally stable catalysts.

6 Claims, No Drawings

HYDROTHERMALLY STABLE METAL OXIDE SOLID SOLUTIONS AS CARRIERS FOR CATALYTIC COMPOSITES

CROSS REFERENCE TO RELATED APPLICATION

This application is a continuation-in-part of my application, U.S. Ser. No. 08/109,557 filed Aug. 20, 1993, now U.S. Pat. No. 5,393,722, all of which is incorporated hereby.

BACKGROUND OF THE INVENTION

Cationic clays are widely distributed in nature and find extensive use in various chemical processes as catalysts and adsorbents. In contrast, anionic clays occur less widely in nature and find only limited use in chemical processes. The interest in anionic clays recently has soared, perhaps in pan because of the recognition that their properties are so different and distinct from more common clays as to pique one's scientific curiosity regarding their potential catalytic properties.

Among the anionic clays hydrotalcite is the best known and has the formula $Mg_6Al_2(OH)_{16}CO_3.4H_2O$, with manasseite, a polymorph, having the same formula. Pyroaurite and sjogrenite are polymorphs of formula $Mg_6Fe_2(OH)_{16}CO_3.4H_2O$. Among other naturally occurring clays having the formula $X_6^{2+}Y_2^{3+}(OH)_{16}CO_3.4H_2O$ may be mentioned stichtite and barbertonite, polymorphs with X=Mg and Y=Cr, takovite (X=Ni and Y=Al), reevesite (X=Ni and Y=Fe) and desautelsite (X=Mg and Y=Mn).

Although the foregoing formula is that of the "ideal" structure for hydrotalcite and its related minerals, it has been known for some time that analogous anionic materials more generally have the formula $[M(II)_{1-x}M(III)_x(OH)_2]^{x+}(A^{n-}_{x/n}).mH_2O$ (F. Cavani et al., *Catalysis Today*, 11, 173–301 (1991), at page 179) where x=0.25, n=2, m=4, and a=$CO_3$ corresponds to the foregoing cases. Using M(II)=Mg, M(III)=Al, and A=$CO_3^=$ as an example, x may vary over a rather broad range of about 0.1 to 0.34, corresponding to a magnesium/aluminum ratio as high as 9 and as low as about 2. We shall refer to materials deviating from the formula for the "ideal" as synthetic hydrotalcites.

In U.S. Pat. Nos. 3,879,523, 3,879,525, and 3,796,792 Miyata et al. describe "composite metal hydroxides having a layer [sic] crystal structure and to a process for the preparation of the same" of formula $$M_x^{2+}M_y^{3+}(OH)_{2x+3y-2z}(A^{2-})_z.aH_2O$$

where the divalent metal could be copper, beryllium, calcium, strontium, barium, zinc, cadmium, tin, lead, manganese, magnesium, and metals of Group VIII, and the trivalent metal could be metals of Group III, titanium, metals of Group V, chromium, manganese, metals of Group VIII, the rare earths and actinides. For $Fe_6Al_2(OH)_{16}CO_3.4H_2O$ the patentees noted that both differential thermal analysis and thermogravimetric analysis showed a first endotherm at 230° C. corresponding to the loss of $4H_2O$, with another at 370° C. corresponding to a loss of $8H_2O$ and $CO_2$. Calcining of their materials afforded a spinel structure, and the patentees noted that dehydration was reversible, with the material rehydrating to the layered double hydroxide structure. Miyata et al. also exemplified several ternary systems and in the latter two of the patents cited above the patentees specifically described cases where $M_x$ was magnesium.

In UK 1,380,949 and 1.380,950 the patentees described as carriers for Ziegler-type catalysts materials obtained by heating at 110°–600° C. layered double hydroxides of formula

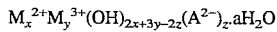

where x was an integer from 2 to 8, y was an integer from 2 to 4, o was an integer from 12 to 18, and p was 1 or 2, followed by chlorination to a chlorine content of 20–70%. The divalent metal could be beryllium, magnesium, calcium, strontium, barium, manganese, iron, cobalt, nickel, zinc, and cadmium in any combination and the trivalent metal was chromium, iron, aluminum, or gallium in any combination. In UK 1,342,020 the patentees described a subgroup where the divalent metal was manganese, nickel, cobalt, copper, zinc or iron and the trivalent metal was aluminum, chromium, or iron and note that whereas the materials made by calcining and reducing the foregoing layered double hydroxides are valuable hydrogenation catalysts, those treated only by calcination were highly efficient dehydration catalysts. Thus, like Miyata et al. the patentees here teach rehydration of calcined material.

Later Miyata et at. (U.S. Pat. No. 4,642,193) teach that layered double hydroxides, and in particular as to those layered double hydroxides where the divalent metal is magnesium, nickel or zinc and the trivalent metal is selected from aluminum, iron, or chromium, calcination at temperatures up to 900° C. produces a metal oxide solid solution (MOSS)—i.e., a homogeneous material where the trivalent metal dissolves in a divalent metal oxide to form a solid solution—which is again convened to the layered double hydroxide in the presence of water. In fact the patentees use the metal oxide solid solution to purify cooling water and specifically teach their rehydration. In U.S. Pat. No. 4,562, 295 Miyata et al. teach binary MOSSs for purifying cyclohexanone containing byproduct organic acids where the divalent metal is magnesium, calcium, zinc, cobalt, nickel, or copper and the trivalent metal is aluminum, iron, chromium, nickel, cobalt, or manganese. Finally, Broecker et al. in U.S. Pat. No. 3,990,866 calcined dried $Ni_5MgAl_2(OH)_{16}CO_3.4H_2O$ at 350°–550° C. and reduced the calcined material to one having zerovalent nickel which was subsequently used as a catalyst in the steam cracking of hydrocarbons.

In this application we describe some ternary metal oxide solid solution systems which have some totally unexpected and extremely useful properties. Whereas the totality of the prior art teaches that the MOSSs are rehydratable to the corresponding layered double hydroxide, the ternary MOSSs of our invention are quite resistant to rehydration. This means they can be used in aqueous or partly aqueous systems for extended periods of time without any physicochemical changes in the system where they are employed, which is important in, for example, circumstances where metal oxide solid solutions exhibit catalytic or adsorbent properties different from, or absent in, layered double hydroxides, or where the metal oxide solid solution is an effective carder (support) for catalytically active species incompatible with layered double hydroxides, or where the catalytically active species manifests different activity when composited on the layered double hydroxides than on the MOSS.

Additionally, some ternary MOSSs of our invention show unexpected non-linear basic properties upon introduction of a ternary metal. For example, in a system of formula $Z_6Al_2O_8(OH)_2$ (vide infra) where the divalent ion Y is substituted for the divalent cation Z, $$Z_6Al_2O_8(OH)_2 \rightarrow Z_{(6-x)}Y_xAl_2O_8(OH)_2 \rightarrow Y_6Al_2O_8(OH)_2$$

and $Y_6Al_2O_8(OH)_2$ is substantially more basic than $Z_6Al_2O_8(OH)_2$ one would expect the basicity to change linearly with increasing amounts of Y. In fact, in some of these systems we have observed that the basicity changes most rapidly with the introduction of relatively small amounts of Y. This affords one the opportunity of effecting significant changes in basicity while effecting only minor changes in other MOSS characteristics.

SUMMARY OF THE INVENTION

The purpose of this invention is to provide ternary metal oxide solid solutions which are resistant to hydration. An embodiment is a metal oxide solid solution of the formula $A_aB_bC_cO_{(a+b+c)}(OH)_c$, where A and B are permutations of divalent metal cations, where the divalent metal is selected from the group consisting of magnesium, nickel, and cobalt and where C is a trivalent metal cation where the metal is selected from the group consisting of aluminum, chromium, gallium, and iron. In a more specific embodiment A and B are magnesium and nickel, respectively, C is aluminum, and the magnesium represents from 5 to 50 atom percent of the total divalent metal cations. In a still more specific embodiment magnesium represents from 5 to 25 atom percent of the total divalent metal cations. In another embodiment A and B are magnesium and cobalt, respectively, C is aluminum, and magnesium represents from 5–25 atom percent of the divalent metal cations. Other embodiments will be clear from the ensuing description.

DETAILED DESCRIPTION OF THE INVENTION

We have found that certain ternary metal oxide solid solutions are quite resistant to rehydration, contrary to prior art teachings. Since MOSSs already are thermally stable, the ternary MOSSs of our invention are hydrothermally stable materials. Hydrothermal stability often is lacking in materials such as gamma-alumina, thus the ternary MOSSs of this invention have great promise as a carrier or support for catalytically active species used in aqueous systems at elevated temperatures. Their resistance to rehydration also means that catalytic activity attributable to the MOSS itself will not change in aqueous systems owing to conversion of the MOSS to a layered double hydroxide with a distinctly different catalytic activity. Additionally, it has been observed that ternary MOSSs manifest large changes in their basic properties upon incorporation of magnesium as a divalent cation, making it possible to tailor the basicity of MOSSs while leaving other characteristics largely untouched.

The ternary metal oxide solutions of this invention may be represented by the formula $$A_aB_bC_cO_{(a+b+c)}(OH)_c$$

where A and B represent divalent metal cations and C represents a trivalent metal cation, or some combination of trivalent metal cations. Representing the formula of our metal oxide solid solutions in this way clearly points out their basic character. The divalent metal cations used in the compositions of our invention are magnesium, nickel, and cobalt. Among the trivalent metal cations may be mentioned those of aluminum, chromium, gallium, and iron, in any combination, along with the trivalent lanthanides in combination with aluminum or gallium. The lanthanide metals are those of atomic number from 57 through 71 with lanthanum and cerium being the most important members of this group.

The subscripts a, b, and c represent the relative number of gram atoms of the cations A, B, and C, respectively. For the metal oxide solid solutions of our invention (a+b)/c ranges from about 1.5 up to about 5. That is, the relative number of gram atoms of the divalent metals are from about 1.5 up to about 5 times that of the trivalent metal. This ratio is independent of the nature of A or B. On the other hand, the range of values of the ratio a/(a+b) does vary with the nature of the divalent metals since some characteristics of the resulting ternary MOSS are sensitive to the relative amounts of the divalent metals. For example, where A=magnesium and B=nickel, it is found that the ternary MOSS is quite resistant to rehydration at a nickel content of about 50 atom percent of the total divalent metal present and higher, although the ternary MOSS having even 5 atom percent nickel relative to the total of magnesium and nickel is resistant to rehydration relative to the MOSS where magnesium is the sole divalent metal. Similar characteristics are exhibited by the MOSS where A is magnesium and B is cobalt. Where A is cobalt and B is nickel the MOSS is hydration-resistant over the entire range of cobalt content, although values of a/(a+b) from 0.05 to 0.95 (5–95 atom percent cobalt relative to the total of cobalt and nickel) are preferred. The combination of unusual basicity (vide infra) and hydration resistance for the Mg-containing MOSSs make the preferred range of a(a+b) from 5 to 50 atom percent where A=Mg and B=Ni and from 5–75 atom percent where A=Mg and B=Co. In the Mg/Ni/Al system the dramatic increase in basicity with the incorporation of small amounts of Mg make the range $0.05 \leq Mg/Mg+Ni \leq 0.25$ especially interesting, which is also the case for Mg/Co/Al.

Where A is magnesium, the basicity increases quickly with the introduction of magnesium. In all cases basicity was measured by the conversion of acetonylacetone to methylcyclopentane as described by R. M. Dessau, *Zeolites*, 10, 205 (1990). For example, in the case where B is nickel and C is aluminum, where there is no magnesium the material is about 14% as basic as the MOSS containing 100% magnesium as the divalent metal. On the other hand, increasing the magnesium content from 0 to 5 gram atom percent increases the basicity (relative to the all-magnesium system) from 14 to 52%; increasing the magnesium to 25% increases the basicity to 62%. Similar large increases in basicity with the addition of small amounts of magnesium is noted in the magnesium/cobalt/aluminum metal oxide.

The preparation of our metal oxide solid solutions starts from layered double hydroxides of formula $$A_aB_bC_c(OH)_{(2a+2b+2c)}(Z^{n-})_{c/n} \cdot mH_2O$$

where $Z^{n-}$ is an anion, conveniently $CO_3^=$, and $mH_2O$ is water of hydration. These layered double hydroxides are prepared by mixing aqueous solutions of suitable salts of A, B, C preferably at a temperature between about 0° and 10° C. to afford a precursor gel. Suitable salts of the metals in question include nitrates, carbonates, and sulfates. Other salts also may be used, especially those which decompose on calcination, such as hydroxide and carboxylic acid salts. Addition is performed at a pH of from about 9 up to about 14 and when addition is complete the mixture is stirred at a temperature generally between about 50° and about 80° C. for times which are typically on the order of 1 to about 24 hours. The layered double hydroxides which form are then collected, washed well with water, and dried, often at a temperature of about 100° C.

The ternary metal oxide solid solutions of this invention are then prepared by calcination of the layered double hydroxide at temperatures between about 400° and about 750° C. for a time from about 1 to about 16 hours. The unusual stability of the solid solutions of a divalent metal oxide and a trivalent metal oxide prepared according to the foregoing procedure is evidenced by the fact that spinel formation is not seen until calcination temperatures of about 800° C., whereas in the prior art the spinel phase begins to appear at a calcination temperature of about 600° C. In addition, the MOSSs of our invention show greater product homogeneity as evidenced by the resistance to spinel formation.

The metal oxide solid solutions of this invention may be used per se or they may be employed as a carrier for catalytically active species. A limitation may arise in the use of our materials because of the propensity of both nickel and, to a somewhat lesser degree, of cobalt to be reduced to the zerovalent state in a reductive atmosphere, especially in the presence of hydrogen. In such cases the support initially is a metal oxide solid solution of the type described above but may be transformed to one where at least some of nickel and/or cobalt is reduced to its metallic state, hence the support itself undergoes both a physical or chemical change in a reductive environment which may make the MOSSs of our invention unsuitable as a carrier or support. In summary, the MOSSs of our invention may have limited utility, at best, in a reductive environment.

Where there is no reductive environment it is expected that the nickel and/or cobalt is unaffected, and the MOSSs of this invention may find utility as a support for such catalytically active metals as molybdenum vanadium, copper, chromium, manganese, silver, and titanium, especially where the foregoing are in an upper valence state and are used to facilitate oxidation. Examples of suitable valence states include Mo(VI), V(V), Cu(II), Cr(VI), Mn(VII), Mn(VI), and Ti(IV). Some of the metal cations ought not to be present above some well-defined maximum concentrations relative to total octahedral cations. Thus, octahedral copper should represent no more than about 25 mole percent of all octahedral cations; molybdenum, vanadium, and chromium no more than about 10 mole percent; and manganese, tin no more than 5 mole percent. Examples of processes where such composites can be expected to be useful include the oxidation of benzylic carbons on an aromatic nucleus, e.g, para-xylene to terephthalic acid, oxidation of mercaptans generally, epoxidation of alkenes, and the hydroxylation of aromatics to phenols.

The materials of our invention also may be used as a support for zeolites or molecular sieves of various types. For example, they may be used as a carrier for titanium silicalites to provide a potent oxidation catalyst in a basic environment. The MOSSs of our invention also may be used as a binder for zeolites and molecular sieves, much as alumina is currently used as a binder. Exemplary of suitable zeolites and molecular sieves are the ZSM family, including silicalite, zeolite Y (and the LZ-210 family), zeolite beta, AlPOs, SAPOs, titanosilicates and titanoaluminosilicates. The MOSSs of our invention can be used similarly for clays and pillared clays without limitation, as may be illustrated by montmorillonite, beidellite, laponite, saponite, kaolin, vermiculite, sepiolite, and attapulgite as well as pillared clays. Such materials are too well known to require an extensive description here. The foregoing composites can be expected to find use as catalysts in such diverse processes as alkylation, xylene isomerization, methanol to olefin synthesis, and light paraffin conversion.

We anticipate that the metal oxide solid solutions of our invention will find increasing use as a support for various materials, especially when their resistance to rehydration is a requisite feature.

The following examples are merely illustrative of our invention and do not limit it in any particular way.

EXAMPLE 1

Preparation of Mg/Ni/Al MOSSs 1. 5% Mg. A 2 L, 3-necked round bottomed flask was equipped with a reflux condenser, a thermometer, a mechanical stirrer, and a Glass Col heating mantle. To this 3-neck flask was added a solution containing 585 g of water, 60 g of $Na_2CO_3.H_2O$ and 71 g of NaOH. This flask was cooled to <5° C. An addition funnel was charged with a solution of 375 g water, 6.5 g $Mg(NO_3)_2.6H_2O$, 139 g $Ni(NO_3)_2.6H_2O$ and 93 g $Al(NO_3)_3.9H_2O$. The addition funnel was put in place of the reflux condenser. This solution was added over a period of 4 hours. The solution temperature was maintained at <5° C. throughout the addition. This slurry was stirred for 1 hour at <5° C. The addition funnel was removed and the reflux condenser replaced. This solution was heated to 60° C. ±5° C. for 1 hour. The slurry was then cooled to room temperature and the solids recovered by filtration. The solids were washed with 10 L of hot DI water. The solids were then dried at 100° C. for 16 hours. This product was characterized as hydrotalcite by its XRD pattern. After crushing, the solid was calcined at 450° C. for 12 hours in a muffle furnace with an air flow. This product was characterized as a $MgO—NiO—Al_2O_3$ solid solution by XRD. The BET surface area for this material was 205 m²/g. Alternatively, the hydrotalcite slurry/paste can be extruded prior to drying and calcining.

2. 25% Mg. A 2 L, 3-necked round bottomed flask was equipped with a reflux condenser, a thermometer, a mechanical stirrer, and a Glass Col heating mantle. To this 3-neck flask was added a solution containing 585 g of water, 60 g of $Na_2CO_3.H_2O$ and 71 g of NaOH. This flask was cooled to <5° C. An addition funnel was charged with a solution of 378 g water, 32.5 g $Mg(NO_3)_2.6H_2O$, 110 g $Ni(NO_3)_2.6H_2O$ and 93 g $Al(NO_3)_3 9H_2O$. The addition funnel was put in place of the reflux condenser. This solution was added over a period of 4 hours. The solution temperature was maintained at <5° C. throughout the addition. This slurry was stirred for 1 hour at <5° C. The addition funnel was removed and the :reflux condenser replaced. This solution was heated to 60° C. ±5° C. for 1 hour. The slurry was then cooled to room temperature and the solids recovered by filtration. The solids were washed with 10 L of hot DI water. The solids were then dried at 100° C. for 16 hours. This product was characterized as hydrotalcite by its XRD pattern. After crushing, the solid was calcined at 450° C. for 12 hours in a muffle furnace with an air flow. This product was characterized as a $MgO—NiO—Al_2O_3$ solid solution by XRD. The BET surface area for this material was 199 m²/g. Alternatively, the hydrotalcite slurry/paste can be extruded prior to drying and calcining.

3. 50% Mg. A 2 L, 3-necked round bottomed flask was equipped with a reflux condenser, a thermometer, a mechanical stirrer, and a Glass Col heating mantle. To this 3-neck flask was added a solution containing 592 g of water, 60 g of $Na_2CO_3.H_2O$ and 71 g of NaOH. This flask was cooled to <5° C. An addition funnel was charged with a solution of 375 g water, 65 g $Mg(NO_3)_2.6H_2O$, 73.5 g $Ni(NO_3)_2.6H_2O$ and 93 g $Al(NO_3)_3.9H_2O$. The addition funnel was put in place of the reflux condenser. This solution was added over a period of 4 hours. The solution temperature was maintained at <5° C. throughout the addition. This slurry was stirred for 1 hour at <5° C. The addition funnel was removed and the reflux condenser replaced. This solution was heated to 60° C. ±5° C. for 1 hour. The slurry was then cooled to room temperature and the solids recovered by filtration. The solids were washed with 10 L of hot DI water. The solids were then dried at 100° C. for 16 hours. This product was characterized as hydrotalcite by its XRD pattern. After crushing, the solid was calcined at 450° C. for 12 hours in a muffle furnace with an air flow. This product was characterized as a MgO—NiO—$Al_2O_3$ solid solution by XRD. The BET surface area for this material was 212 $m^2/g$. Alternatively, the hydrotalcite slurry/paste can be extruded prior to drying and calcining.

EXAMPLE 2

Preparation of Co/Ni/Al MOSS (20% Co)

A 2 L, 3-necked round bottomed flask was equipped with a reflux condenser, a thermometer, a mechanical stirrer, and a Glass Col heating mantle. To this 3-neck flask was added a solution containing 618 g of water, 58 g of $Na_2CO_3.H_2O$ and 72 g of NaOH. This flask was cooled to <5° C. An addition funnel was charged with a solution of 342 g water, 35 g $Co(NO_3)_2.6H_2O$, 139 g $Ni(NO_3)_2.6H_2O$ and 75 g $Al(NO_3)_3.9H_2O$. The addition funnel was put in place of the reflux condenser. This solution was added over a period of 4 hours. The solution temperature was maintained at <5° C. throughout the addition. This slurry was stirred for 1 hour at <5° C. The addition funnel was removed and the reflux condenser replaced. This solution was heated to 60° ±5° C. for 1 hour. The slurry was then cooled to room temperature and the solids recovered by filtration. The solids were washed with 10 L of hot DI water. The solids were then dried at 100° (2 for 16 hours. This product was characterized as hydrotalcite by its XRD pattern. After crushing, the solid was calcined at 450° C. for 12 hours in a muffle furnace with an air flow. This product was characterized as a CoO—NiO—$Al_2O_3$ solid solution by XRD. The BET surface area for this material was 209 $m^2/g$. Alternatively, the hydrotalcite slurry/paste can be extruded prior to drying and calcining.

EXAMPLE 3

Preparation of Co/Mg/Al MOSSs 1. 5% Co. A 2 L, 3-necked round bottomed flask was equipped with a reflux condenser, a thermometer, a mechanical stirrer, and a Glass Col heating mantle. To this 3-neck flask was added a solution containing 610 g of water, 60 g of $Na_2Co_3.H_2O$ and 102 g of NaOH. This flask was cooled to <5° C. An addition funnel was charged with a solution of 436 g water, 9 g $Co(NO_3)_2.6H_2O$, 156 g $Mg(NO_3)_2.6H_2O$ and 81 g $Al(NO_3)_3.9H_2O$. The addition funnel was put in place of the reflux condenser. This solution was added over a period of 4 hours. The solution temperature was maintained at <5° C. throughout the addition. This slurry was stirred for 1 hour at <5° C. The addition funnel was removed and the reflux condenser replaced. This solution was heated to 60° C. +5° C. for 1 hour. The slurry was then cooled to room temperature and the solids recovered by filtration. The solids were washed with 10 L of hot DI water. The solids were then dried at 100° C. for 16 hours. This product was characterized as hydrotalcite by its XRD pattern. After crushing, the solid was calcined at 450° C. for 12 hours in a muffle furnace with an air flow. This product was characterized as a MgO—CoO—$Al_2O_3$ solid solution by XRD. The BET surface area for this material was 175 $m^2/g$. Alternatively, the hydrotalcite slurry/paste can be extruded prior to drying and calcining.

2. 20% Co. A 2 L, 3-necked round bottomed flask was equipped with a reflux condenser, a thermometer, a mechanical stirrer, and a Glass Col heating mantle. To this 3-neck flask was added a solution containing 610 g of water, 60 g of $Na_2Co_3.H_2O$ and 102 g of NaOH. This flask was cooled to <5° C. An addition funnel was charged with a solution of 435 g water, 44 g $Co(NO_3)_2.6H_2O$, 154 g $Mg(NO_3)_2.6H_2O$ and 94 g $Al(NO_3)_3.9H_2O$. The addition funnel was put in place of the reflux condenser. This solution was added over a period of 4 hours. The solution temperature was maintained at <5° C. throughout the addition. This slurry was stirred for 1 hour at <5° C. The addition funnel was removed and the reflux condenser replaced. This solution was heated to 60° C. ±5° C. for 1 hour. The slurry was then cooled to room temperature and the solids recovered by filtration. The solids were washed with 10 L of hot DI water. The solids were then dried at 100° C. for 16 hours. This product was characterized as hydrotalcite by its XRD pattern. After crushing, the solid was calcined at 450° C. for 12 hours in a muffle furnace with an air flow. This product was characterized as a MgO—CoO—$Al_2O_3$ solid solution by XRD. The BET surface area for this material was 189 $m^2/g$. Alternatively, the hydrotalcite slurry/paste can be extruded prior to drying and calcining.

EXAMPLE 4

Preparation of Ti(IV) Supported on a Mg/Co/Al MOSS

The preparation of this material is analogous to the Mg/Co/Al MOSS containing 20% Co as described in Example 3, except that after the initial MgO—CoO—$Al_2O_3$ is formed and stirred for 1 hour at <5° C., there may be added 2.1 g $Ti(iso-OC_3H_7)_4$ in 10 g of ethanol alcohol. The addition funnel is removed and the reflux condenser replaced, and the solution may be heated to 60° C. ±5° C. for 1 hour. The slurry may be then cooled to room temperature and the solids recovered by filtration, then washed with 10 L of hot DI water and subsequently may be dried at 100° C. for 16 hours. This product may be characterized as a MOSS by its XRD pattern. After crushing, the solid may be calcined at 400° C. for 6 hours in a muffle furnace with an air flow. The BET surface area for this material may be on the order of 260 $m^2/g$. Alternatively, the MOSS slurry/paste can be extruded prior to drying and calcining.

Similar MOSS-supported material may be made in an analogous fashion where the supported metal is Cu(II), Mo(VI), V(V), Cr(VI), and so forth.

EXAMPLE 5

Preparation of ZSM-5+MOSS Extrudates

A Mg/Ni/Al MOSS with 50% Mg may be prepared according to the procedure described in Example 1. After the solids are recovered and washed, a portion of the washed gel may be retained while the remainder may be dried at 100° C. for 16 hours. The dried solids may be combined with ZSM-5 zeolite and the remaining hydrotalcite gel such that the zeolite/MOSS ratio is 1:10. This dough may be passed through an extruder. The extrudates may be dried at 110° C. for 12 hours and then calcined at 450° C. for 12 hours in a muffle furnace with an air flow.

The foregoing preparation is but representative of the use of MOSSs as a binder for a broad spectrum of zeolites and molecular sieves.

What is claimed is:

1. A composite comprising a) a ternary metal oxide solid solution of formula, $$A_a(II)B_b(II)C_c(III)O_{(a+b+c)}(OH)_c$$

where:

a, b, and c are atom fractions of A(II), B(II), and C(III), respectively;

C(III) is a trivalent metal cation whose metal is selected from the group consisting of Al, Cr, Ga, Fe, and combinations thereof, and combinations of Al and metals of atomic number 57 through 71;

A(II) and B(II) are divalent metal cations and
  i. A is Mg, B is Ni, and $0.05 \leq a/(a+b) \leq 0.5$; or
  ii. A is Mg, B is Co, and $0.05 \leq a/(a+b) \leq 0.75$; or
  iii. A is Co, B is Ni, and $0.05 \leq a/(a+b) \leq 0.95$;
and $1.5 \leq (a+b)/c \leq 5.0$;

and b) at least one catalytically active species selected from the group consisting of zeolites, synthetic molecular sieves; clays and pillared clays; and molybdenum, vanadium, copper, chromium, manganese, silver, and titanium in an upper valence state.

2. The composite of claim 1 where C is aluminum.

3. The composite of claim 1 where A and B are Mg and Ni, resp., $0.05 \leq a/(a+b) \leq 0.5$, and C is aluminum.

4. The composite of claim 3 where $0.05 \leq a/(a+b) \leq 0.25$.

5. The composite of claim 1 where A and B are Mg and Co, resp., $0.05 \leq a/(a+b) \leq 0.75$, and C is aluminum.

6. The composite of claim 1 where A and B are Co and Ni, resp., $0.05 \leq a/(a+b) \leq 0.95$, and C is aluminum.

* * * * *